United States Patent
Denecheau et al.

(10) Patent No.: US 7,106,695 B2
(45) Date of Patent: Sep. 12, 2006

(54) METHOD OF ALLOCATING BANDWIDTH TO THE STATIONS OF A LOCAL AREA NETWORK

(75) Inventors: Lionel Denecheau, La Colle sur Loup (FR); Denis Esteve, Vence (FR); Patrick Sicsic, La Colle sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 10/156,320

(22) Filed: May 28, 2002

(65) Prior Publication Data
US 2002/0181505 A1    Dec. 5, 2002

(30) Foreign Application Priority Data
May 29, 2001   (EP)   ................................ 1480039

(51) Int. Cl.
*H04J 3/14*   (2006.01)
(52) U.S. Cl. ............ 370/230; 370/258; 370/400; 370/477; 709/225; 709/226; 709/251
(58) Field of Classification Search ........... 370/395.53, 370/258
See application file for complete search history.

(56) References Cited

U.S. PATENT DOCUMENTS

| | | | |
|---|---|---|---|
| 4,941,152 A * | 7/1990 | Medan | 375/245 |
| 5,146,499 A | 9/1992 | Geffrotin | 380/23 |
| 5,243,335 A * | 9/1993 | Kato et al. | 370/453 |
| 6,434,118 B1 * | 8/2002 | Kirschenbaum | 370/236.1 |
| 6,570,880 B1 * | 5/2003 | Coden | 370/404 |

* cited by examiner

*Primary Examiner*—Hassan Kizou
*Assistant Examiner*—Brian Roberts
(74) *Attorney, Agent, or Firm*—David L. Adour

(57) ABSTRACT

A method of bandwidth management over a transmission network comprising a plurality of stations forming a logical ring that circulates a token from station to station. Each station is allowed to transmit data to other stations over the transmission network when it receives the token. The station is allowed to transmit C bytes, where C is a credit. The credit increases in proportion to the time spent since the preceding reception of the token by the station.

4 Claims, 3 Drawing Sheets

METHOD OF ALLOCATING BANDWIDTH TO THE STATIONS OF A LOCAL AREA NETWORK

TECHNICAL FIELD

The present invention relates to bandwidth management between the stations in a data transmission network of the Ethernet type and relates in particular to a method of allocating bandwidth to the stations of a Local Area Network such as an Ethernet network.

BACKGROUND

On local Area Networks (LANs) of the Ethernet type able to transmit data at speeds higher than one gigabit/s, an unlimited number of stations can be connected to a shared medium. To control the exchange of data between the stations connected on the shared medium, Ethernet uses a protocol called Carrier Sense, Multiple Access Collision Detect (CSMA/CD). The "Multiple Access" part means that every station is indeed connected to the shared medium forming a single data path. The "Carrier Sense" part means that before transmitting data, a station checks to see whether any other station is already transmitting. If the transmission medium appears to be idle, the station may begin to send data. However, two stations can start transmitting at the same time, causing a collision. When this occurs, each interfering station detects the collision. Hence, all stations attempt to transmit, back off, and try retransmissions at randomly selected later times, thus minimizing the chance of another collision.

Although Ethernet does not set an upper limit to the number of stations that can be connected on the same transmission medium, there are, in practice, drastic limitations. Generally speaking, as more users are added to a shared network, or as applications requiring more data are added, performance inevitably deteriorates. This is because the users become competitors in trying to use a common resource: the shared transmission medium. It is generally agreed that a moderately loaded 10 Mbps Ethernet shared by 30–50 users can sustain a throughput in the neighborhood of only 2.5 Mbps after accounting for packet overhead, inter-packet gaps, and collisions resulting in the use of the CSMA/CD protocol. Thus, although simple, CSMA/CD protocol is limited in its ability to take advantage of the intrinsic performance of the shared transmission medium i.e., 10 Mbps in this example.

Further increasing the number of users (and therefore packet transmissions) creates an even higher collision potential. Since collisions occur when two or more stations attempt to send information at the same time, when these stations realize that a collisions has occurred, they must, to obey the Ethernet standard, all shut off for a random time before attempting another transmission. This tends to add a considerable overhead, severely impacting performance. Consequently, the Ethernet mechanism collapses when the shared medium is overloaded.

One well-known solution to this problem is to segment traffic over independent, disjoint, smaller collision domains, which comes at the expense of having to put in place extra devices to allow communication between the independent pieces of the LAN thus created. This may be accomplished by using a bridge or a switch. For example, an eight-port high-speed switch can support eight Ethernets, each running at a full 10 Mbps and thereby interconnects more users on what appears to them as a single LAN. Such a solution, which creates a more expensive and complicated network, goes against the original objectives of the Ethernet LAN, which were to provide a very inexpensive solution, simple to manage for local communications over a campus or between the employees of a company dispersed over a group of buildings.

Another solution consists in implementing a token-passing mechanism of Token Ring LAN so that the physical Ethernet network becomes collision free and therefore can be used at higher rates. In this mechanism, a logical ring is formed between connected stations and a token is circulated among the connected stations that are part of the logical ring. Then, a station of the logical ring is permitted to transmit only while holding the token, thereby preventing collisions from happening.

Although the above system prevents collisions between stations, it does not prevent a station from monopolizing the bandwidth and preventing other stations from transmitting.

SUMMARY OF THE INVENTION

Accordingly, an object of the invention is to provide a method of bandwidth management between the stations of an Ethernet network enabling each station of a logical ring to use a bandwidth which is determined according to pre-defined parameters.

Another object of the invention is to provide a method of ensuring a guaranteed bandwidth to each station of an Ethernet network, thereby making the network deterministic in terms of throughput and response time.

The invention therefore relates to a method of bandwidth management that ensures a guaranteed bandwidth to each station of a transmission network comprising a plurality of stations forming a logical ring upon which a token is circulated from station to station. Each station is allowed to transmit data to other stations over the transmission network upon receipt of the token while holding the token. During the time the station is transmitting data, a credit of data bytes allowed to be transmitted upon reception of said token is allocated each station. This credit is increased in proportion to the elapsed time since the preceding reception of the token.

BRIEF DESCRIPTION OF THE DRAWINGS

The above and other objects, features and advantages of the invention will be better understood by reading the following detailed description of the invention in conjunction with the accompanying drawings wherein.

DETAILED DESCRIPTION OF THE INVENTION

Figure 1:
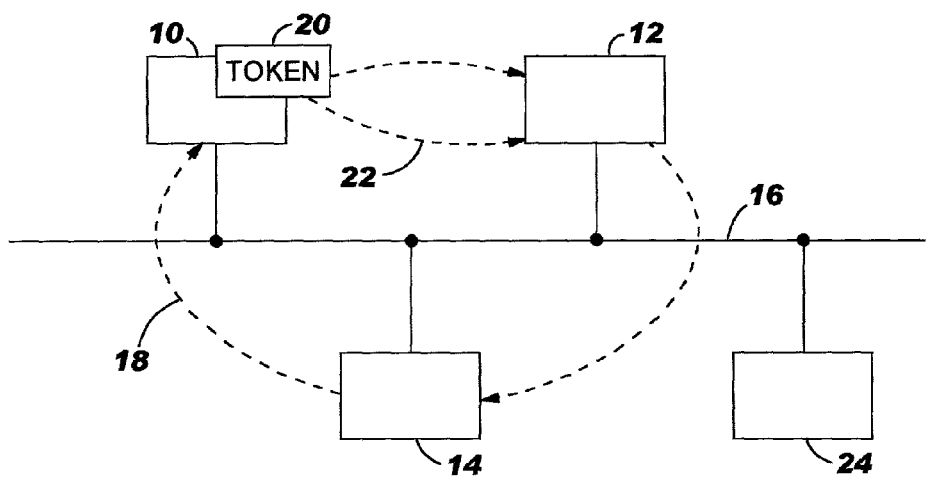
FIG. 1 is a schematic representation of stations of an Ethernet network organized as a logical ring wherein the invention may be implemented.

According to FIG. 1, an Ethernet LAN includes several stations 10, 12 and 14 physically connected on the shared medium 16 in the manner of a standard Ethernet LAN, but organized so that they form a logical ring 18. This organization is achieved through the circulation of a token 20 which takes the form of a special Ethernet frame, forwarded 22 from one station to a next, e.g., from station 10 to station 12.

It is worth noting here that not all stations connected on the same LAN segment need to participate into the collision-free ring 18 thus formed. The invention assumes that both types of protocols (collision and collision-free) may coexist at any given instant so that a station like 24 need not implement the new protocol while still being able to communicate with all the others connected on the shared transmission medium 16 using the regular collision protocol.

Figure 2:
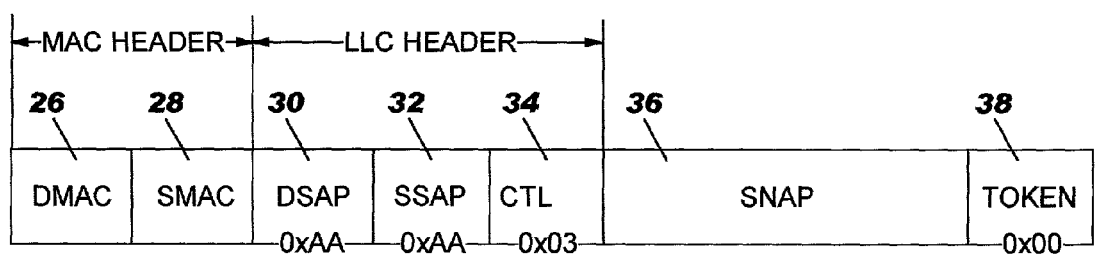
FIG. 2 illustrates the format of a token used in a logical ring according to FIG. 1.

As represented in FIG. 2, the token may include the following information:

An Ethernet Destination MAC address 26, i.e. the MAC address of the next ring station.

An Ethernet Source MAC address 28, i.e. the MAC address of the station sending the token.

A destination SAP (Service Access Point) 30 which, in the OSI model, is used to identify the individual application on a host which is sending a packet. A destination SAP address 30 having a HEX value of AA is however used here, which is the standard way of actually defining the type of application in the following SNAP (SubNetwork Access Protocol) field.

A source SAP 32, i.e. the counterpart of the here above destination SAP. It takes a HEX value of AA too.

A control field 34 which takes a HEX value of 03 to indicate that this is a UI (Unnumbered Information) frame.

The five above fields are the standard Ethernet MAC and LLC header fields.

Two following fields are specific to the logical ring.

A SNAP 5-byte header field introducing a new Ether-type, i.e. a collision-free Ethernet ring 36.

A 1-byte token field 38 to help manage the circulation of the token (however, this is not mandatory), and which takes a default HEX value of 00.

Therefore, the token is a standard Ethernet frame uniquely identified through its SNAP field 36. Its sole possession, by a station, thus gives implicit permission to use the shared transmission medium on which functional frames can be placed before the token is passed to the next station in sequence.

Hence, logical ring 18 may be thought of as a list of stations pertaining to the ring. Actually, each station needs only to hold a record of the next and previous station identifiers in the form of their MAC addresses. Thus, when a station like station 10 has the token, it is allowed to transmit functional frames destined to another station (if it has indeed something to transmit) while holding the token. The transmission is achieved by placing the functional frames on the shared transmission medium 16 irrespective of the mode of propagation (unicast, multicast or broadcast) so that the receiving station(s), which, are listening, can catch it. At completion of transmission, station 10 that currently holds the token, must forward it 22 through the shared transmission medium, to the next station 12 in sequence of the logical ring, using the MAC address.

One aspect of the invention is to determine for each station the credit of data bytes this station may transmit whenever it receives the token which is circulating from station to station over the logical ring.

Credit allocated to a station depends upon specific parameters of the station, which are:

CIR, standing for Committed Information Rate, which is the guaranteed transmission rate in bits/second that the station can use to transmit data.

TB, standing for Transmission Burst, which is the maximum of data bytes the station may transmit on the network upon reception of the token.

Figure 3:
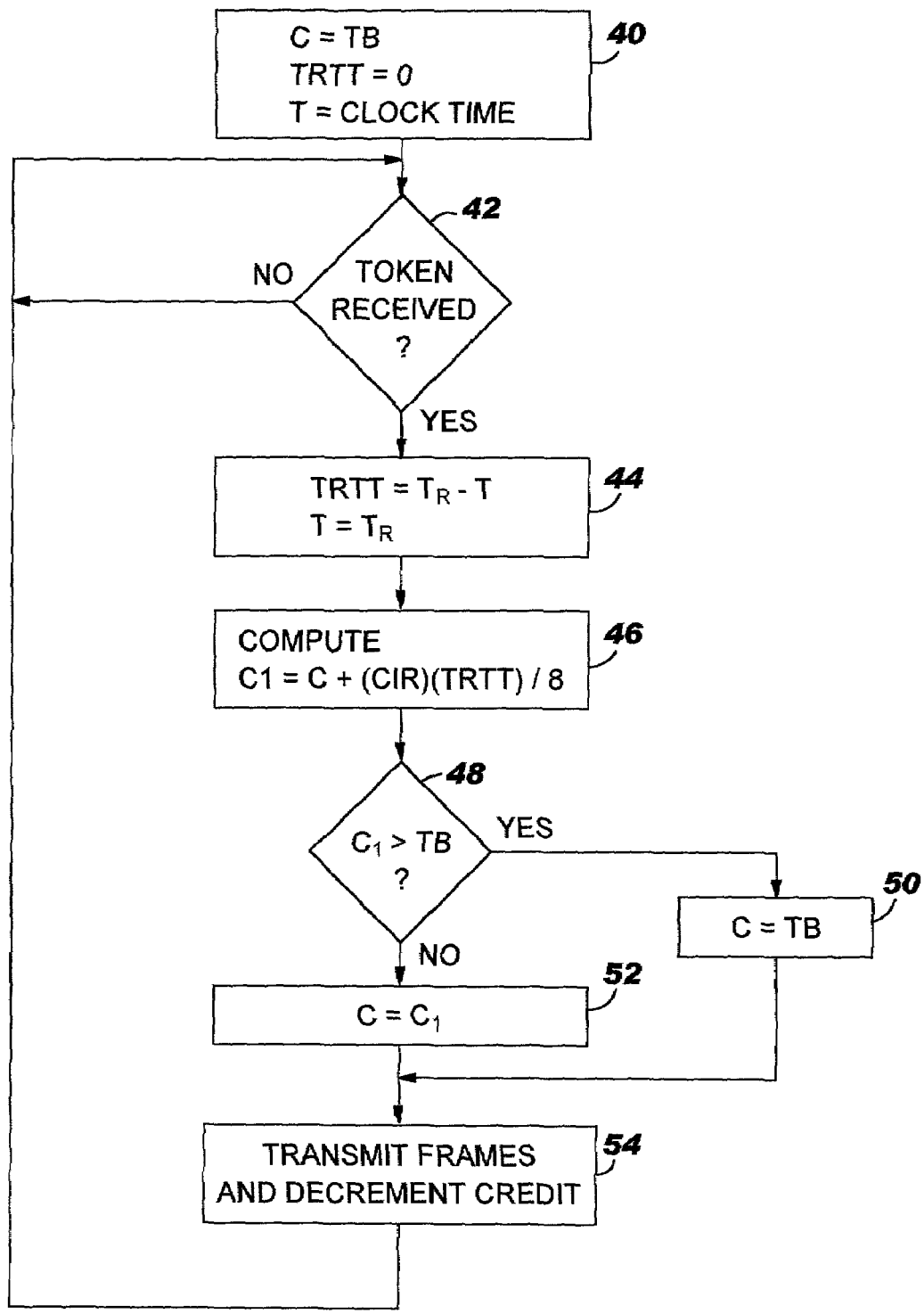
FIG. 3 represents a flow chart of steps used in the method according to the invention.

Referring to FIG. 3, at the initial time, the station initializes three variables (step 40).

C: Credit, which is equal to the number of data bytes the station is allowed to transmit upon reception of the token;

TRTT: Token Round Trip Time, which is the time in seconds taken for the token to circulate around the logical ring since the preceding reception of the token by the station; and T: which is the time when the token is received by the station.

Accordingly, C is set to TB, which is the absolute maximum of data bytes which may be transmitted; TRTT is set to 0, since the station does not know a preceding time of a token reception; and T is set to the clock time.

After the initialization of the station parameters, the station waits for the token (step 42) and loops back as long as the token is not received. Upon receiving the token, the station notes the reception time $T_R$, and sets the variable TRTT to $T_R-T$ (representing the last token round trip time) and sets the variable T to $T_R$ (step 44).

Then, the processing unit of the station computes (step 46) an intermediary variable as follows:

$$C_1=C+(CIR)(TRTT)/8$$

which means that the credit of the station can be increased by a number of bytes which is proportional to the token round trip time of the token from the preceding reception by the station. At this step, it is checked whether the value of $C_1$ is greater than TB (step 48). If so, C is set to TB (step 50) since TB is the maximum of bytes which are allowed to be transmitted. If not, the value of C is set to $C_1$ (step 52).

Figure 4:
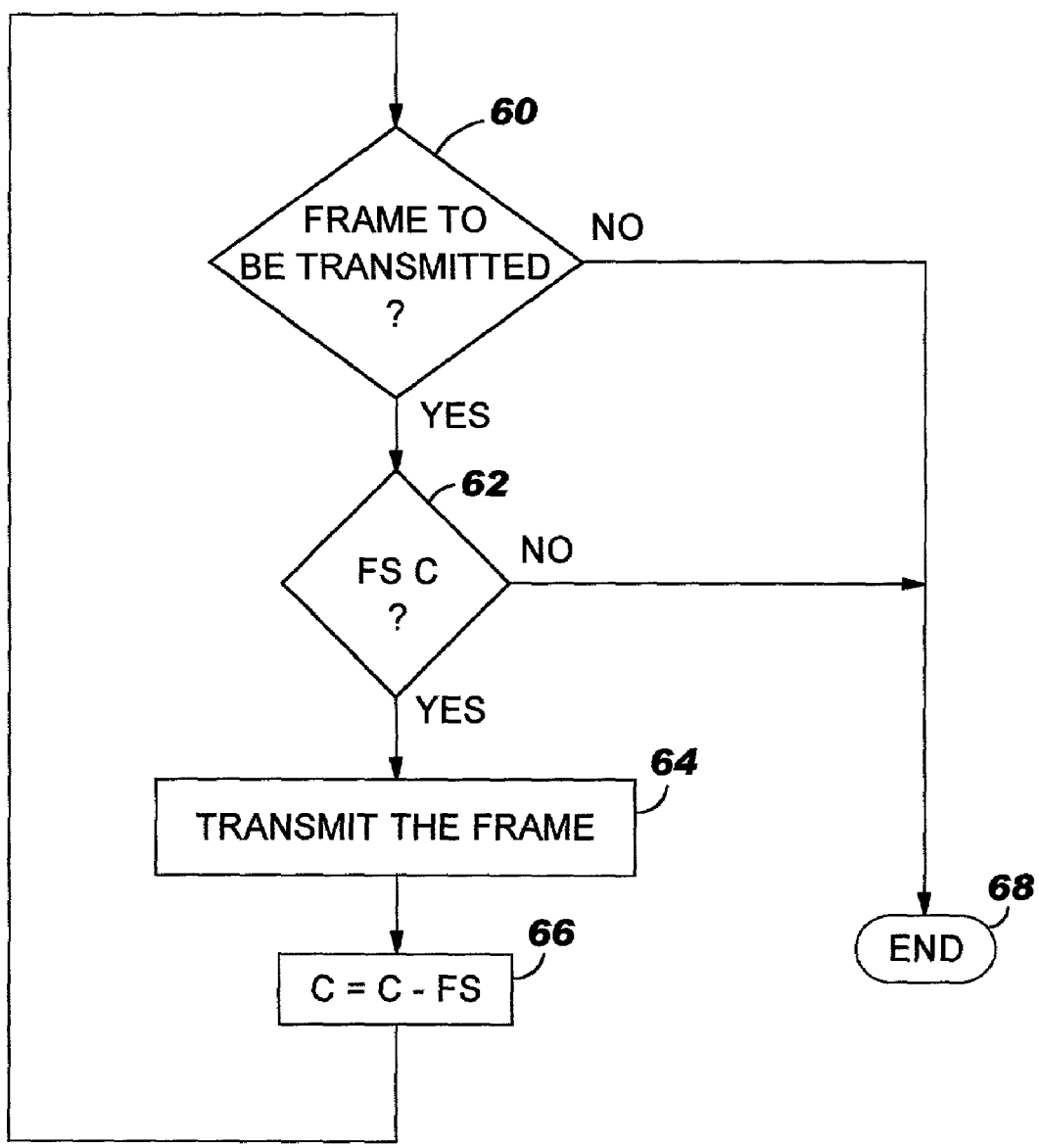
FIG. 4 is a flow chart showing details of the step for decrementing the credit in a station used in the method illustrated in FIG. 1.

Finally, the station transmits its data frames over the network and decrements its credit C (step 54) according to the substeps represented in FIG. 4.

First of all, it is determined whether the station has at least one frame to be transmitted (step 60). In such a case, it is checked whether the size FS of the frame to be transmitted is less than or equal to the credit C (step 62). If so, the frame is transmitted (step 64) and the credit is decremented and set to the new value:

$$C=C-FS \text{(step 66)}$$

Then, the process loops back to the step of determining whether there is a frame to be transmitted (step 60). The process is repeated as long as there is a frame to be transmitted and if there is a credit sufficient to transmit the frame. When there is no frame to be transmitted or if the size of the frame exceeds the credit C, the process of frame transmission is ended (step 68).

It must be noted that the two parameters CIR and TB are specific to each station and therefore are predefined for the station. Thus, on a 10 Mbps Ethernet LAN, a server could be configured with a CIR=1 Mbps whereas the other stations could be configured each with CIR=100 Kbps. But, the sum of all configured CIR should not exceed the bandwidth on the network in order to guarantee the CIR for each station and not to oversubscribe the network.

Likewise, the predetermined maximum value of TB is configurable on each station. This parameter should allow a station that has not transmitted for a certain time to transmit several frames with only one token. However, the value of TB must not be too high to avoid generating a peak of traffic. A good value for TB is 3×1500 bytes (1500 bytes corresponds to the MTU on Ethernet) which allows the transmission of 3 large Ethernet frames.

We claim:

1. A bandwidth management method for a token-passing logical ring, comprising the steps of:
   determining, by a station connected to a token-passing logical ring, a token round trip time; and
   determining a credit that specifies a quantity of data the station is allowed to transmit;
   wherein the credit is determined as a function of the token round trip time.

2. A bandwidth management method for a token-passing logical ring, comprising the steps of:
   determining, by a station connected to a token-passing logical ring, a token round trip time;
   determining a credit that specifies a quantity of data the station is allowed to transmit, wherein the credit is determined as a function of the token round trip time;
   comparing the credit with a predetermined maximum value; and
   when the credit is less than the predetermined maximum value, allowing the station to transmit the quantity of data specified by the credit upon receipt of a token.

3. The method of claim 2, further including the step of:
   when the credit is greater than the predetermined maximum value, allowing the station to transmit a quantity of data specified by the predetermined maximum value.

4. A bandwidth management method for a token-passing logical ring, comprising the steps of:
   determining, by a station connected to a token-passing logical ring, a token round trip time, by computing a difference between a first time of reception of a token by the station and a second time of reception of the token by the station;
   computing a credit that specifies a quantity of data the station is allowed to transmit, wherein the step of computing a credit includes a step of multiplying the token round trip time by a predetermined committed information rate associated with the station;
   comparing the credit with a predetermined maximum value;
   when the credit is less than the predetermined maximum value, allowing the station to transmit the quantity of data specified by the credit upon receipt of a token; and
   when the credit is greater than the predetermined maximum value, allowing the station to transmit a quantity of data specified by the predetermined maximum value.

* * * * *